US011354696B1

(12) United States Patent
Moore et al.

(10) Patent No.: US 11,354,696 B1
(45) Date of Patent: Jun. 7, 2022

(54) SYSTEMS AND METHODS FOR IMPLEMENTING A REWARDS PROGRAM

(71) Applicant: 84.51, LLC, Cincinnati, OH (US)

(72) Inventors: Philip Moore, Lawrenceburg, IN (US); Matthew Wiley, Fort Thomas, KY (US); Christopher Mathers, Cincinnati, OH (US)

(73) Assignee: 84.51, LLC, Cincinnati, OH (US)

( * ) Notice: Subject to any disclaimer, the term of this patent is extended or adjusted under 35 U.S.C. 154(b) by 252 days.

(21) Appl. No.: 15/927,817

(22) Filed: Mar. 21, 2018

(51) Int. Cl.
G06Q 30/02 (2012.01)
H04W 4/02 (2018.01)
G06F 3/06 (2006.01)

(52) U.S. Cl.
CPC ......... *G06Q 30/0224* (2013.01); *G06F 3/067* (2013.01); *G06F 3/0683* (2013.01); *H04W 4/02* (2013.01)

(58) Field of Classification Search
CPC ..... G06F 3/0683; G06F 3/06; G06Q 30/0224; H04W 4/02
See application file for complete search history.

(56) References Cited

U.S. PATENT DOCUMENTS

| 6,463,457 | B1 | 10/2002 | Armentrout et al. |
| 6,757,730 | B1 | 6/2004 | Lee et al. |
| 7,933,895 | B2 | 4/2011 | Amjadi |
| 8,037,187 | B2 | 10/2011 | Dawson et al. |
| 8,156,107 | B2 | 4/2012 | Bawa et al. |
| 8,249,940 | B2 | 8/2012 | Hubbard |
| 9,361,344 | B2 | 6/2016 | Murthy et al. |
| 2007/0271234 | A1 | 11/2007 | Ravikiran |
| 2008/0235317 | A1 | 9/2008 | Burgmans |
| 2013/0191414 | A1 | 7/2013 | Srivastava et al. |

(Continued)

FOREIGN PATENT DOCUMENTS

WO  2006/046070 A1  5/2006

OTHER PUBLICATIONS

Nadiminti, Krishna & Assuncao, Marcos & Buyya, Rajkumar. Distributed Systems and Recent Innovations: Challenges and Benefits. (Jan. 2006). InfoNet Magazine. 16. p. 1-5. (Year: 2006).*

*Primary Examiner* — Katherine Kolosowski-Gager
*Assistant Examiner* — Stephanie Madison Davis
(74) *Attorney, Agent, or Firm* — Stites & Harbison, PLLC; Terry L. Wright; Gary N. Stewart

(57) ABSTRACT

Systems and methods for implementing a rewards program for registered customers of a business make use of a central computer server and a database that is in communication with the central computer server and that stores data about the registered customers. Multiple mobile devices associated with the various registered customers communicate with the central computer server via a software application running on the mobile device, and a subset of the data from the database is thereby communicated to each of the multiple mobile devices from the central computer server. A query of the data about the registered customers is then initiated from the central computer server and communicated to each of the multiple mobile devices via the software application running on each of the multiple mobile devices, with a result of the query being processed on each of the multiple mobile devices then communicated back to the central computer server.

8 Claims, 1 Drawing Sheet

(56) References Cited

U.S. PATENT DOCUMENTS

| | | |
|---|---|---|
| 2016/0034954 A1 | 2/2016 | Tollinger et al. |
| 2016/0155145 A1 | 6/2016 | Katz et al. |
| 2016/0247178 A1 | 8/2016 | Gujar et al. |
| 2017/0178174 A1* | 6/2017 | Mitchell ............ G06Q 30/0233 |

* cited by examiner

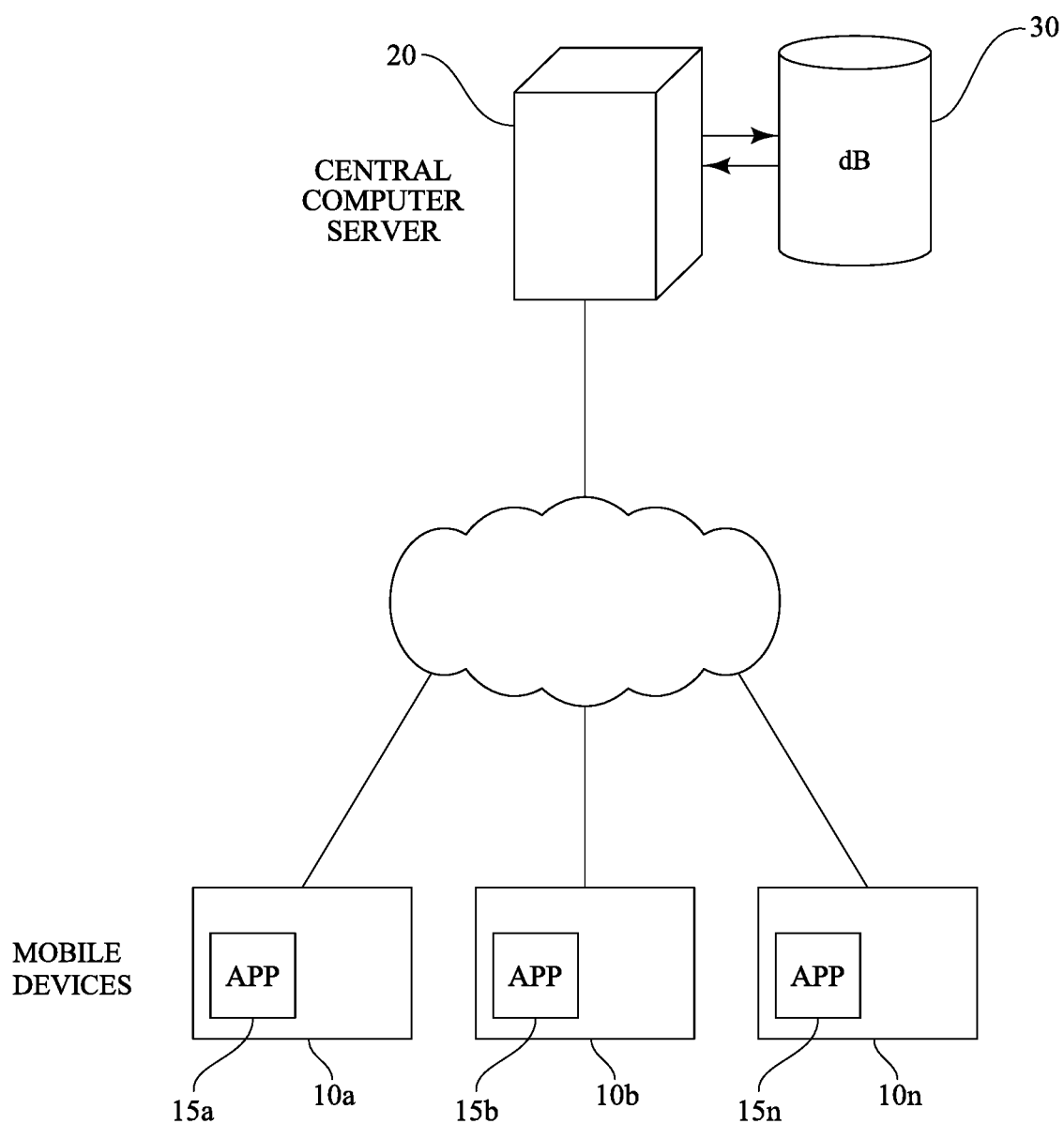

SYSTEMS AND METHODS FOR IMPLEMENTING A REWARDS PROGRAM

TECHNICAL FIELD

The present invention relates to systems and methods for implementing a rewards program. In particular, the present invention relates to systems and methods for implementing a rewards program that make use of a distributed computing network for storing and querying data associated with registered customers of a business.

BACKGROUND

Customer rewards programs are becoming increasingly popular as a means to reward customers who are loyal to a business and make frequent purchases at that business. To enroll in such rewards programs, a customer will typically submit his/her identifying information, such as name, location, and contact information, to the business, and that identifying information is then used to create and is linked to a rewards account. In making subsequent purchases, a registered customer then provides the rewards account information at the time of the purchase, and the registered customer thereby earns "points" that become associated with the account. Upon accumulation of a fixed amount of points, the registered customer can redeem the points for discounts on goods or services, free items, or other such special customer offers. In exchange for the benefits offered by the rewards programs, the business then typically not only receives an increased number of visits from the registered customers enrolled in the program, but is also able to collect large amounts of data associated with their registered customers, including data associated with a particular registered customer's purchase history, the frequency at which a particular product is purchased, the amounts of a particular product purchased, and the like. That data is then able to be processed by the business to guide future business decisions.

Traditionally, companies have made use of on-site distributed computing solutions to process large amounts of data, such as the data gathered as part of a rewards program. These distributed computing solutions typically leverage an onsite cluster of computers that are physically present at a particular location to "divide and conquer" massive computing workloads. Building and maintaining such an internal computing infrastructure, however, can often be cost-prohibitive, particularly when large amounts of data must be processed. Cloud computing technology has recently proved to be an effective means of lowering those costs, but even with cloud computing, it can often be cost prohibitive to scale beyond hundreds of computer nodes due to hardware costs, software licenses, and/or support costs. Accordingly, a distributed computing system and method that further lowers operational costs by requiring less hardware and/or less software licenses to process large amounts of data, such as data associated with customers of a business, would be both highly desirable and beneficial.

SUMMARY

The present invention is a system and method for implementing a rewards program that makes use of a distributed computing network for storing and querying data associated with registered customers of a business.

In an exemplary implementation of a system and method for implementing a rewards program for registered customers of a business, multiple customers enroll in the rewards program and are in communication with a central computer server and associated database. As described above, in enrolling in such a rewards program, a customer typically provides certain data, including his/her name, location, and contact information. The collected data about each of the registered customers is then stored in the database, along with point-of-purchase data that is subsequently collected each time a registered customer makes a purchase and links the purchase to his/her rewards account.

As part of the rewards program, the registered customer generally installs a software application (or "app") on a mobile device that allows the registered customer to use and interact with the rewards program via communications with the central computer server. In this regard, such mobile devices include, but are not limited to, smartphones, tablets, or similar computing device with a microprocessor, an internal memory component (e.g., a hard drive or solid-state drive), and a display screen. Communications between the central computer server and the mobile devices are commonly facilitated through an internet connection, satellite communications, or other communications network or similar known means of data transport.

Furthermore, in exchange for enrolling in the rewards program, the registered customer agrees that certain data may be stored on the mobile device on which the software application is installed. As such, a subset of the data collected about the registered customers is distributed and communicated from the database and the central computer server to a mobile device of the registered customer. The subset of data is stored in a memory component on each of the multiple mobile devices and is accessible via the software application running on the mobile device. In this way, in the systems and methods of the present invention, a query of the data about the registered customers can be initiated from the central computer server and communicated to each of the multiple mobile devices via the software application running on each of the multiple mobile devices. Each of the multiple mobile devices then processes the query on the subset of the data stored in the memory component of the mobile device, and the result of that query is then communicated back to the central computer server. In some implementations, the database can thus be characterized as a relational database that, via the central computer server, pushes a micro data mart to each of the mobile devices, while the mobile devices become nodes within a distributed computing network. In exchange for receiving a subset of data about the registered customers of the rewards program, in certain implementations, each of the registered customers then receives rewards, such as points that are capable of being redeemed as savings on goods, such as gasoline and/or groceries.

In addition to the distributed computing capabilities of the systems and methods of the present invention, and in addition to receiving the subset of data about the other registered customers of the rewards program, each registered customer also receives his/her own point-of-purchase data on his/her respective mobile device to allow the registered customer's mobile device to further serve as a personalization engine for that particular registered customer. The receipt of his/her own point-of-purchase data not only allows each registered customer to be provided with real-time reports detailing statistics about the past interactions with the business, but further allows additional rewards or savings opportunities to be passed along to the registered customers in real-time and based on, for example, a particular registered customer's location, the registered customer's purchase history, and/or a timing of an offer. In some implementations, an analysis of the data associated with the particular registered customer can also be initiated from the central computer server in order to identify and offer a reward to one or more of the registered customers via the software application running on their respective computing devices.

Further features and advantages of the present invention will become evident to those of ordinary skill in the art after a study of the description, figures, and non-limiting examples in this document.

BRIEF DESCRIPTION OF THE DRAWINGS

FIG. 1 is a schematic diagram showing an exemplary system for implementing a rewards program in accordance with the present invention.

DESCRIPTION OF EXEMPLARY EMBODIMENTS

The present invention is a system and method for implementing a rewards program that makes use of a distributed computing network for storing and querying data associated with registered customers of a business.

Referring now to FIG. 1, in an exemplary implementation of a system and method for implementing a rewards program for registered customers of a business, multiple customers enroll in the rewards program and are in communication with a central computer server 20 and associated database 30. As described above, in enrolling in such a rewards program, a customer typically provides certain data, such as his/her name, location, and contact information. The collected data about each of the registered customers is then stored in the database 30.

Specifically, and as shown in FIG. 1, as part of the rewards program, the registered customer typically installs a software application (or "app") 15a, 15b, . . . 15n on a mobile device 10a, 10b . . . 10n that allows the registered customer to use and interact with the rewards program via communications with the central computer server 20. Such mobile devices 10a, 10b . . . 10n include, but are not limited to, smartphones, tablets, or similar computing devices with a microprocessor, an internal memory component (e.g., a hard drive or solid-state drive), and a display screen. Communications between the central computer server 20 and the mobile devices 10a, 10b . . . 10n are generally facilitated through an internet connection, satellite communications, or other communications network or similar known means of data transport. Of course, in some implementations, it is also contemplated that at least some registered customers could also be in communication with the central computer server 20 and associated database 30 via a desktop or personal computer with a software component that communicates with the central computer server 20, such as via a web-based application accessible through a common internet browser program.

With respect to the database 30 included in the exemplary system for implementing a rewards program as shown in FIG. 1, the database 30 initially receives and stores data about each of the registered customers, including the customer's login credentials, name, location, and/or contact information. Subsequently, after enrollment, the database 30 is then used to collect and store point-of purchase data associated with each of the registered customers each time a registered customer provides his/her rewards account information at the time of a purchase. As a result, the database 30 stores data that includes, but is not limited to, amounts spent in a given time period (e.g., week, month, year, lifetime), visit frequency, and items purchased. Further, in the context of a grocery store rewards program, the data can include data related to the health of a customer's diet, pharmacy information such as potential drug interactions, calories associated with purchased foods, food recalls, and the like.

In exchange for enrolling in the rewards program, the registered customer agrees that a subset of data collected from the registered customers may be stored on the mobile device 10a, 10b . . . 10n on which the software application 15a, 15b, . . . 15n is installed. As such, a subset of the data about the registered customers is distributed and communicated from the database 30 and the central computer server 20 to a mobile device 10a, 10b . . . 10n of each of the registered customers and is stored in the memory component of each of the mobile devices 10a, 10b, . . . 10n. In other words, each of the registered customers receives a random portion of data from the database 30, such that the mobile device 10a, 10b . . . 10n of the registered customer can serve as a node within a distributed computing network.

With further reference to FIG. 1, a query of the data about the registered customers can then be initiated from the central computer server 20 and communicated to each of the mobile devices 10a, 10b . . . 10n via the software application 15a, 15b . . . 15n running on each of the mobile devices 10a, 10b . . . 10n of the registered customers. In this way, the database 30 can thus be characterized as a relational database that, via the central computer server, pushes a micro data mart to each mobile device 10a, 10b . . . 10n of the respective registered customers, while the mobile devices 10a, 10b . . . 10n of each of the registered customers becomes a node within a distributed computing network. In some implementations, the micro data mart included on each of the mobile devices 10a, 10b . . . 10n contains a subset or shard of the transactional records for a list of registered customers from a point of sale system. In this way, in certain implementations, the dimensional data contained within such a micro data mart is the only data needed to support that subset of transaction records and, in turn, allows for no shuffling between the working nodes within the systems of the present invention as all of the data necessary to support the subset or shard of transaction records is present within the micro data mart. Moreover, in such implementations and because all the necessary dimensional records are present in those data marts, each of the mobile devices 10a, 10b . . . 10n can perform join operations in which no data is dropped out (i.e., a lossless join), as opposed to other database systems in which dimensional data is copied in full to each worker node (e.g., mobile device) or in which the data must be broadcast during query execution to each worker node.

After receiving the query, each of the mobile devices 10a, 10b . . . 10n of the registered customers then processes the query on the subset of data stored in the memory component of the respective mobile device 10a, 10b . . . 10n. The result of the query is then communicated back to the central computer server 20 from each of the mobile devices 10a, 10b . . . 10n. In this way, the systems and methods of the present invention thus allow for Structured Query Language (SQL) database queries for execution among the various mobile devices 10a, 10b . . . 10n (i.e., the nodes) in the network, where the results are sent back to and assembled at the central computer server 20 that initiated the query. Further, by making use of such a distributed computing network, the central computer server 20 can assemble answers to queries with data that was processed entirely within the network of mobile devices 10a, 10b . . . 10n or can assemble answers to queries where the data is processed both on the various mobile devices 10a, 10b . . . 10n of the registered customers and on the central computer server 20. For example, in certain implementations, 60% of the data for a particular query can be distributed among and/or processed on the mobile devices 10a, 10b . . . 10n of the registered customers, while 40% of the necessary data remains with the central computer server 20 and database 30. In such situations, the systems and methods of the present invention and, in particular, the central computer server 20 can leverage the network of mobile devices 10a, 10b . . . 10n of the registered customers for 60% of the work and then assemble the result from the mobile devices 10a, 10b . . . 10n along with the result of the 40% of the data that was processed by the central computing server 20.

With respect to the size (i.e., amount) of the subset of data communicated to each of the mobile devices 10a, 10b . . . 10n of the registered customers, in certain implementations, it can be a fixed amount of data, such that each mobile device 10a, 10b . . . 10n of each registered customer receives the same amount of data and devotes the same amount of computing or processing capability of his/her respective mobile device 10a, 10b . . . 10n to the distributed computing network. Alternatively, in other implementations, the registered customer can select the amount of computing resources that is to be devoted to the distributed computing network, such that the registered customer has command of his/her computing resources being allocated to the distributed computing network, and such that various amounts or sizes of subsets of data can be communicated and distributed to each of the registered customers. For instance, in certain implementations, each registered customer can select the percentage of the CPU of his/her computing device, the percentage of the storage on his/her device, and/or the amount of his/her battery allocated to the distributed computing network, as well as whether the distributed computing network can communicate with the respective mobile devices 10a, 10b . . . 10n via wireless communications (i.e., Wi-Fi) only or whether the communication can also be carried out via a cellular transmission (i.e., using data available through the registered customer's cellular data plan). Depending on the extent of computing resources allocated to the distributed computing network on a respective registered customer's mobile device 10a, 10b . . . 10n, the registered customer can then be rewarded accordingly, with greater allocations of resources leading to an increased amount of rewards, as described in further detail below.

In exchange for having a subset of data about the registered customers of the rewards program communicated to and stored on their mobile devices, each of the registered customers of the rewards program receive rewards (e.g., "points") that are capable of being redeemed as savings on goods, such as gasoline and groceries, or with competitive pricing. Such rewards can be communicated from the central computer server 20 to the mobile devices 10a, 10b . . . 10n of the registered customers in real-time (e.g., as the registered customer's computing resources are being utilized) or can be provided at regular time intervals (e.g., monthly) based on the amount of computing resources a particular registered customer has agreed to allocate to the distributed computing network.

In addition to the distributed computing capabilities of the systems and methods of the present invention, and in addition to receiving the subset of data about the other registered customers of the rewards program, each registered customer also receives his/her own point-of-purchase data on his/her mobile device 10a, 10b . . . 10n to allow the registered customer's mobile device to further serve as a personalization engine for that particular registered customer. The receipt of his/her own point-of-purchase data not only allows each registered customer to be provided with real-time reports detailing statistics about the past interactions with the business, but further allows additional rewards or savings opportunities to be passed along to the registered customers in real-time and based on, for example, a particular registered customer's location, the registered customer's purchase history, and/or a timing of an offer. For instance, in some implementations, the software application 15a, 15b . . . 15n running on each of the mobile devices 10a, 10b . . . 10n of the registered customers can communicate a present location of each mobile device 10a, 10b . . . 10n (e.g., at a location of the business offering the reward) to the central computing server 20. Upon communicating the location, an analysis of the data associated with the particular registered customer is initiated from the central computer server 20 in order to identify and offer a reward to the registered customer via the software application 15a, 15b . . . 15n running on his/her respective one of the mobile devices 10a, 10b . . . 10n. In this regard, in some implementations, the reward can be identified based, at least in part, on the present location of the each of the mobile devices 10a, 10b . . . 10n of the registered customers.

In some implementations, and irrespective of the location of the registered customer, an analysis of data associated with a particular registered customer can be initiated from the central computer server whereby a potential reward (e.g., a coupon) is communicated to the mobile device 10a, 10b . . . 10n for scoring based on, for example, the customer purchase history that may be related to the offer. The scores are then communicated back to the central computer server 20 from the mobile devices 10a, 10b . . . 10n where they are ranked before the final reward is communicated to the mobile device 10a, 10b . . . 10n of the registered customer via the software application 15a, 15b . . . 15n.

Finally, with respect to the central computer servers used in accordance with the present invention, it should be readily apparent to one of ordinary skill in the art that software running on the central computer server causes computer-readable instructions stored in a memory component of the central computer server to be executed by a microprocessor of the central computer server. Similarly, with respect to the app, it should be readily apparent to one of ordinary skill in the art that the app causes computer-readable instructions stored in the memory component of the smartphone, tablet, or other computing device to be executed by the microprocessor of the of the smartphone, tablet, or other computing device. In view of the foregoing description of the system and method of the present invention, such computer-readable instructions can be readily coded into computer readable form using standard programming techniques and languages by one of ordinary skill in the art.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A system for registered customers of a business, comprising:
    a central computer server;
    a database in communication with the central computer server, which stores data about the registered customers of the business; and
    multiple mobile devices, each of the multiple mobile devices communicating with the central computer server via a software application running on the mobile device, and wherein each of the multiple mobile devices is associated with a particular registered customer,
    wherein a subset of the data about the registered customers from the database is communicated to each of the multiple mobile devices from the central computer server via the software application running on each of the multiple mobile devices and stored in a memory component on each of the multiple mobile devices, the subset of data comprising data from multiple of the registered customers,
    wherein data associated with the particular registered customer of each of the multiple mobile devices is also stored in the memory component of the mobile device and is accessible via the software application running on the mobile device,
    wherein a query of the data about the registered customers can be initiated from the central computer server and communicated to each of the multiple mobile devices via the software application running on each of the multiple mobile devices, with each of the multiple mobile devices processing the query on the subset of the data about the registered customers stored in the memory component of the mobile device, and with a result of the query processed on each of the multiple mobile devices then communicated back to the central computer server,
    wherein the central computer server is configured to communicate a reward to one or more of the registered customers via the software application running on the multiple mobile devices based on the data associated with the particular registered customer of each of the multiple mobile devices, and
    wherein the reward communicated to one or more of the registered users is selected based on a size of the subset of data communicated and stored in the memory component of the mobile device of each of the one or more registered customers.

2. The system as recited in claim 1, wherein each of the multiple mobile devices is a smart phone.

3. The system as recited in claim 1, wherein the software application on each of the multiple mobile devices communicates a present location of the mobile device to the central computer server.

4. A system for registered customers of a business, comprising:
    a central computer server;
    a database in communication with the central computer server, which stores data about the registered customers of the business; and
    multiple mobile devices, each of the multiple mobile devices communicating with the central computer server via a software application running on the mobile device, and wherein each of the multiple mobile devices is associated with a particular registered customer;
    wherein a subset of the data about the registered customers from the database is communicated to each of the multiple mobile devices from the central computer server via the software application running on each of the multiple mobile devices and stored in a memory component on each of the multiple mobile devices, the subset of data comprising data from multiple of the registered customers,
    wherein data associated with the particular registered customer of each of the multiple mobile devices is also stored in the memory component of the mobile device and is accessible via the software application running on the mobile device,
    wherein a query of the data about the registered customers can be initiated from the central computer server and communicated to each of the multiple mobile devices via the software application running on each of the multiple mobile devices, with each of the multiple mobile devices processing the query on the subset of the data about the registered customers stored in the memory component of the mobile device, and with a result of the query processed on each of the multiple mobile devices then communicated back to the central computer server,
    wherein the software application on each of the multiple mobile devices communicates a present location of the mobile device to the central computer server,
    wherein the central computer server is configured to communicate a reward to one or more of the registered customers via the software application running on the multiple mobile devices based, in part, on the present location of each of the multiple mobile devices,
    wherein a registered customer allocates at least one of a percentage of CPU, percentage of storage, or amount of battery of their mobile device to the distributed computing network,
    wherein the size of the subset of data communicated to the mobile device is based on the allocation, and
    wherein the reward communicated to one or more of the registered users is selected based on a size of the subset of data communicated to the mobile device of each of the one or more registered customers.

5. A method for registered customers of a business, comprising the steps of:
    compiling a database of data about the registered customers of the business, the database being managed by a central computer server;
    creating a network of multiple mobile devices in communication with the central computer server via a software application running on each of the multiple mobile devices, wherein each of the multiple mobile devices is associated with a particular registered customer, and data associated with the particular registered customer is also stored in a memory component on the mobile device and is accessible via the software application running on the mobile device;
    communicating a subset of the data about the registered customers from the database of data about the registered customers to each of the multiple mobile devices from the central computer server via the software application running on each of the multiple mobile devices, with the subset of the data about the registered customers stored in the memory component on each of the multiple mobile devices, and with the subset of data comprising data from multiple of the registered customers;

initiating a query of the data about the registered customers from the central computer server and communicating the query to each of the multiple mobile devices via the software application running on the mobile device, with each of the multiple mobile devices processing the query on the subset of data about the registered customers stored in the memory component of the mobile device, and with a result of the query then communicated back from each of the multiple mobile devices to the central computer server; and communicating, via the central computer server, a reward to one or more of the registered customers via the software application running on the multiple mobile devices based on the data associated with the particular registered customer of each of the multiple mobile devices, wherein the reward communicated to one or more of the registered users is selected based on a size of the subset of data communicated and stored in the memory component of the mobile device of each of the one or more registered customers.

6. The method as recited in claim 5, wherein each of the multiple mobile devices is a smart phone.

7. The method as recited in claim 5, wherein the software application on each of the multiple mobile devices communicates a present location of the mobile device to the central computer server.

8. A method for registered customers of a business, comprising the steps of:

compiling a database of data about the registered customers of the business, the database being managed by a central computer server;

creating a network of multiple mobile devices in communication with the central computer server via a software application running on each of the multiple mobile devices, wherein each of the multiple mobile devices is associated with a particular registered customer, and data associated with the particular registered customer is also stored in a memory component on the mobile device and is accessible via the software application running on the mobile device;

communicating a subset of the data about the registered customers from the database of data about the registered customers to each of the multiple mobile devices from the central computer server via the software application running on each of the multiple mobile devices, with the subset of the data about the registered customers stored in the memory component on each of the multiple mobile devices, and with the subset of data comprising data from multiple of the registered customers; and initiating a query of the data about the registered customers from the central computer server and communicating the query to each of the multiple mobile devices via the software application running on the mobile device, with each of the multiple mobile devices processing the query on the subset of data about the registered customers stored in the memory component of the mobile device, and with a result of the query then communicated back from each of the multiple mobile devices to the central computer server;

communicating, via the software application on each of the multiple mobile devices, a present location of the mobile device to the central computer server; and communicating, via the central computer server, a reward to one or more of the registered customers via the software application running on the multiple mobile devices based, in part, on the present location of each of the multiple mobile devices, wherein a registered customer allocates at least one of a percentage of CPU, percentage of storage, or amount of battery of their mobile device to the distributed computing network, wherein the size of the subset of data communicated to the mobile device is based on the allocation, and wherein the reward communicated to one or more of the registered users is selected based on a size of the subset of data communicated to the mobile device of each of the one or more registered customers.

* * * * *